US006984371B2

(12) United States Patent
Zhao et al.

(10) Patent No.: US 6,984,371 B2
(45) Date of Patent: Jan. 10, 2006

(54) PROCESS FOR CATALYTIC REFORMING

(75) Inventors: Shizhong Zhao, Louisville, KY (US); Jon P. Wagner, Louisville, KY (US)

(73) Assignee: Sud-Chemie Inc., Louisville, KY (US)

( * ) Notice: Subject to any disclaimer, the term of this patent is extended or adjusted under 35 U.S.C. 154(b) by 17 days.

(21) Appl. No.: 10/969,695

(22) Filed: Oct. 20, 2004

(65) Prior Publication Data

US 2005/0058594 A1 Mar. 17, 2005

Related U.S. Application Data

(62) Division of application No. 10/206,547, filed on Jul. 26, 2002, now abandoned.

(51) Int. Cl.
*C01B 3/26* (2006.01)
*C07C 1/02* (2006.01)

(52) U.S. Cl. ............... 423/651; 423/654; 423/656; 252/373

(58) Field of Classification Search ............... 502/327, 502/328, 335, 337, 341, 415, 439; 423/651, 423/654, 656; 252/373
See application file for complete search history.

(56) References Cited

U.S. PATENT DOCUMENTS

| | | |
|---|---|---|
| 3,759,678 A | 9/1973 | Chamberland |
| 3,931,053 A | 1/1976 | Kazakov |
| 4,101,449 A | 7/1978 | Noda |
| 4,337,178 A | 6/1982 | Atwood |
| 4,371,452 A | 2/1983 | Ohsaki |
| 4,388,877 A | 6/1983 | Molayem |
| 4,530,918 A | 7/1985 | Sambrook |
| 4,539,310 A | 9/1985 | Leftin |
| RE32,044 E | 12/1985 | Atwood |
| 4,707,351 A | 11/1987 | Lord |
| 4,876,031 A * | 10/1989 | Najjar et al. ................. 252/373 |
| 4,906,603 A | 3/1990 | Burgfels |
| 4,988,661 A | 1/1991 | Arai |
| 5,041,408 A | 8/1991 | King |
| 5,356,851 A | 10/1994 | Sarrazin |
| 5,753,143 A | 5/1998 | Bhat |
| 5,773,589 A | 6/1998 | Shoji |
| 5,855,815 A * | 1/1999 | Park et al. ................... 252/373 |
| 6,238,816 B1 | 5/2001 | Cable |
| 6,242,380 B1 | 6/2001 | Park |
| 6,261,465 B1 | 7/2001 | Hancock |
| 6,261,991 B1 | 7/2001 | Numaguchi |
| 6,402,989 B1 * | 6/2002 | Gaffney ....................... 252/373 |
| 6,693,060 B2 | 2/2004 | Park |
| 6,773,691 B2 * | 8/2004 | Ramani et al. .............. 423/651 |
| 6,808,652 B2 * | 10/2004 | Park et al. .................... 252/373 |

OTHER PUBLICATIONS

Borowiecki, T., "Nickel Catalysts for Steam Reforming of Hydrocarbons; Size of Crystallites and Resistance to Coking", *Applied Catalysis*, 4 (1982), pp. 223-231.
Lemonidou, A.A., et al., "Carbon dioxide reforming of methane over 5 wt. % Ni/CaO-Al$_2$O$_3$ catalyst", *Applied Catalysis*, A: General 228 (2002), pp. 227-235.
Morioka, H., et al., "Partial oxidation of methane to synthesis gas over supported Ni catalysts prepared from Ni-Ca/Al-layered double hydroxide", *Applied Catalysis*, A: General 215 (2001), pp. 11-19.
Parmaliana, A., et al., "Activity and Characterization of Alkali Doped Ni/MgO Catalysts", *Structure and Reactivity of Surfaces* (1989), pp. 739-748.
Quincoces, C.E., et al., "Effect of addition of CaO on Ni/Al$_2$O$_3$ catalysts over CO$_2$ reforming of methane", Materials Letters 50 (Aug. 2001), pp. 21-27.
Takezawa, N., et al., "Methanation of Carbon Dioxide: Preparation of Ni/MgO Catalysts and Their Performance", *Applied Catalysis*, 23 (1986), pp. 291-298.
Tottrup, P., et al., "Higher hydrocarbon reforming", *Hydrocarbon Processing* ( Mar. 1982), pp. 89-91.
Trimm, O.L., "Catalyst Design for Reduced Coking (Review)", *Applied Catalysis*, 5 (1983), pp. 263-290.
Udengaard, N.R., et al., "Sulfur passivated reforming process lowers syngas H$_2$CO ratio", *Oil & Gas Journal* (Mar. 9, 1992), pp. 62-67.

* cited by examiner

*Primary Examiner*—Cam N. Nguyen
(74) *Attorney, Agent, or Firm*—Scott R. Cox; Joan L. Simunic

(57) ABSTRACT

A process for catalytic reforming of a hydrocarbon feed stream containing H$_2$O, CO$_2$, CH$_4$ and CO at levels such that the H$_2$O/CH$_4$ is less than 0.8 and the CO$_2$/CH$_4$ is greater than 0.5 and the feed stream further contains quantities of sulfur compounds up to about 20 ppm. The catalyst used in this process contains from about 0.5 percent to about 25 percent by weight of a calcium compound additive, from about 2 percent to about 30 percent by weight nickel, and from about 25 percent to about 98 percent by weight of an aluminum compound carrier, wherein substantially all of the calcium is combined with the alumina. The reforming process can be utilized to produce syngas, especially low hydrogen to carbon monoxide ratio syngas for applications such as iron ore reduction.

16 Claims, No Drawings

PROCESS FOR CATALYTIC REFORMING

CROSS REFERENCE TO RELATED APPLICATIONS

This application is a Divisional application of application Ser. No. 10/206,547, filed on Jul. 26, 2002 now abandoned.

BACKGROUND OF INVENTION

This invention relates to a process for catalytic reforming utilizing a highly active catalyst, particularly a calcium promoted, nickel catalyst on an alumina support. This catalyst is particularly useful for this process as it is highly active and resistant to coking especially in a feed stream containing relatively high quantities of sulfur compounds, significant quantities of CO and $CO_2$, and relatively low quantities of steam (the feed stream having a $H_2O/CH_4 < 0.8$ and a $CO_2/CH_4 > 0.5$).

Production of synthesis gas or syngas (various blends of gases generally comprising hydrogen and carbon monoxide) is an important process step in the manufacture of numerous chemicals, such as ammonia and methanol. It is also useful in numerous other commercial processes, such as iron ore reduction, Fischer-Tropsch synthesis and gas-to-liquid technology. Many of the synthesis gas plants produce the syngas by steam reforming hydrocarbons. Typically, these plants employ a process of catalytic steam reforming of methane in the presence of a supported nickel catalyst, usually a nickel on alumina support or promoted alumina support catalyst, which process is described by the following reaction:

$$CH_4 + H_2O \rightleftharpoons CO + 3H_2$$

For a variety of reasons including the prevention of coking, an excess quantity of steam is generally required to be present in the feed stream for this reaction. This excess of steam often results in a water gas shift reaction, namely $$CO + H_2O \rightleftharpoons CO_2 + H_2$$

occurring at the same time as the steam reforming reaction. As a result of these two reactions occurring at the same time, the syngas stream created typically has an $H_2:CO$ ratio greater than 3. (A ratio of three is predicted by the steam reforming reaction alone.) This high concentration of hydrogen in the reaction product is desirable if hydrogen is the targeted product, such as for $NH_3$ synthesis. However, a different $H_2:CO$ ratio is required if the syngas is to be used for other processes, such as iron ore reduction, the production of methanol, Fischer-Tropsch synthesis or gas-to-liquid technology. These processes typically require a $H_2:CO$ ratio in the feed stream in the range of 1.4–2.4, and control of the relative quantities of $H_2$ and CO present in the feed stream is important to these processes.

Because syngas with an $H_2:CO$ ratio of about 2 cannot be produced by a conventional steam reforming reaction, mixed reforming reactions are required where part of the steam in the feed stream is replaced with carbon dioxide. One use of the reaction feed from this type of reaction is for iron ore reduction. In this reaction a reducing gas, comprising mainly $H_2$ and CO and including nominal amounts of $CO_2$ and $H_2O$, is generated in a reformer. This stream is then fed into a furnace where the iron ore is reduced to iron by the following reactions:

$$3CO + Fe_2O_3 \rightarrow 2Fe + 3CO_2$$

$$3H_2 + Fe_2O_3 \rightarrow 2Fe + 3H_2O$$

The gas effluents from the reduction furnace, that contain lower percentages of $H_2$ and CO and higher percentages of $H_2O$ and $CO_2$ plus residual $CH_4$, are then saturated with $H_2O$ in a boiler and recycled back to the reformer as feed stock along with additional hydrocarbons, usually natural gas or $CH_4$.

CO and $H_2$ are necessary components of the iron ore reduction process while $H_2O$ and $CO_2$ function as oxidants and, therefore, are undesirable components which need to be minimized. Ideally the quantity of $H_2O + CO_2$ present in the reformed gas is limited to less than 5 percent. If excess steam and carbon dioxide are present in a feed stream or the reformed gas stream for iron ore reduction, the reducing capability of the reformed gas is minimized, sometimes substantially. Cooling the reformed gas before it enters the reduction furnace can remove some $H_2O$, but cooling results in low energy efficiency of the entire process and is not economically feasible.

In iron ore reduction applications, a typical feed stream for the reformers comprises about 10%–15% $H_2O$, 10%–18% $CO_2$, 15%–20% CO, 15%–25% hydrocarbons (usually natural gas) and the balance $H_2$. (Unless otherwise noted, all the percentages are mole base.) In contrast, in conventional steam reforming reactions, the quantity of $H_2O$ in the feed stream may be as high as 86 percent and is normally at least about 66 percent. The balance of the steam reformer feed stream comprises hydrocarbons (usually natural gas). Minor amounts of $CO_2$ may be present with the natural gas.

In order to maximize $H_2$ and CO concentrations and minimize $H_2O$ and $CO_2$ concentrations in the reformed gas, in addition to using low quantities of $H_2O$, the outlet temperature of the reformer needs to be maintained as high as possible with the temperature usually limited only by the composition of the metal of the reformer tubes. The outlet temperature of this type of reformer is usually maintained in a range of 850° C. to 1000° C., which is higher than that at the outlet of a conventional steam reformer (700° C. to 800° C.). This outlet temperature range is another significant distinction between conventional steam reforming and the reforming utilized for iron ore reduction.

The presence of sulfur compounds in the reforming system deactivates conventional steam reforming catalysts. In fact, quantities of $H_2S$ as low as one part per billion substantially deactivate many conventional steam reforming catalysts. Therefore, sulfur is usually removed before being allowed to enter the reformer. In contrast, in the reducing gas generation process, the feed may include a significant amount of sulfur or sulfur compounds, and the catalysts need to retain sufficiently high reforming activity even at sulfur levels up to about 20 parts per million. While higher temperatures and $H_2$ partial pressures in the reaction feed can reduce the level of deactivation in these feed streams containing sulfur or sulfur compounds, these higher temperatures may also adversely affect the physical structure of the steam reforming catalysts.

Another problem that often occurs with reforming reactions is an enhanced likelihood of coking or carbon formation on the catalysts. In conventional reforming processes, there is essentially no CO in the feed stream. In contrast, in reducing gas generation processes, the low $H_2O$ and high CO and $CO_2$ conditions make coking of the reforming catalysts a problem. In this situation, carbon formation caused by CO at the inlet section of the reformer in the reducing gas generation process occurs. On nickel catalysts the effect of this coking is coating of the active nickel sites and plugging of the pores of the catalyst. In one solution to this problem, manufacturers have used a large excess of $H_2O$ in the reformer feed stream, but this is not suitable for reducing gas generation processes.

Another method of solving the coking problem is by use of a noble metal catalyst, such as is disclosed in U.S. Pat. No. 5,753,143. It is well known that noble metal catalysts have higher coke formation resistance compared to conventional steam reforming catalysts, which merely utilize nickel as the active component. However, these noble metal catalysts are quite expensive, especially with the large quantity of catalysts that is conventionally utilized for this type of reaction.

Another recognized method of addressing the coking problem is by the use of a high dispersion of metal species over the surface of the catalyst, such as the various types of double hydroxide catalysts which are disclosed by Morioka, H., et al. "Partial oxidation of methane to synthesis gas over supported Ni catalysts prepared from Ni—Ca/Al-layered double hydroxide," *Applied Catalysis A*: General 215 pages 11–19, (2001).

Another proposed solution to this coking problem is disclosed in U.S. Pat. No. 4,530,918 which teaches a nickel on alumina catalyst with a lanthanum additive.

Another process for limiting coke formation on nickel catalysts during reforming reactions utilizes the sulfur that is naturally present in the feed stream. In this process sulfur poisons some, but not all, of the nickel sites on the catalyst and produces a reforming catalyst which retains sufficient active sites to be useful for gas production at lower $H_2/CO$ ratios. The mechanism of preventing carbon formation by sulfur poisoning, or passivation, has been described in Udengaard, Niels R., et al. "Sulfur passivated reforming process lowers syngas $H_2/CO$ ratio." *Oil and Gas Journal*, 62–67 (1992). Obviously, in using this process it is critical to control the amount of sulfur that is present in the feed stream so that the catalyst retains sufficient activity for the reforming reaction. This reaction often requires the presence of a substantial quantity of catalyst in the bed.

A method for steam reforming hydrocarbons containing sulfur compounds utilizing a catalyst comprising a noble metal catalyst, a support phase and optionally a catalyst promoter is disclosed in U.S. Pat. No. 6,238,816.

Additives are often added to these conventional steam reforming nickel on alumina catalysts to enhance their performance and to reduce the coking problem. For example, alkali compounds are added to steam reforming catalysts to reduce carbon formation in Trimm, O. L.; *Applied Catalysis*, 5, 263 (1983), Borowiecki, T.; *Applied Catalysis*, 4, 223 (1982), and Tottrup, P. and Nielson, R.; *Hydrocarbon Processing*, 89 (March 1982). However, there are drawbacks to the use of alkali metals because of their potential migration during high temperature processing, which can adversely impact downstream operations.

Magnesia has also been added to steam reforming catalysts to suppress carbon formation, as disclosed in Trimm, O. L.; *Applied Catalysis*, 5, 263 (1983) and Borowiecki, T.; *Applied Catalysis*, 4, 223 (1982). However, one major drawback to the use of magnesia promoted catalysts is that they are hard to reduce and maintain in a reduced state as reported by Parmaliana et al.; "Structure and Reactivity of Surfaces" p 739, (1989). Nickel oxide and magnesia are very similar in structure. Thus, a nickel oxide and magnesia combination material is usually formed during the high temperature reaction. The reducibility of nickel oxide and the activity of a magnesia-based catalyst is heavily dependent on the calcination temperature, as mentioned in Takezawa, et al. *Applied Catalysis*, 23, 291 (1986). A calcination temperature higher than 400C results in less active catalysts as discussed in Parmaliana, et al.; "Structure and Reactivity of Surfaces" p. 739 (1989). In order to form an effective catalyst, the magnesia must totally combine with the alumina support to form magnesium aluminate. If free magnesia is present, it can be hydrated on stream and react with the carbon dioxide during the reforming reaction, resulting in physical degradation of the catalyst. Thus, magnesia-supported nickel catalysts are difficult to utilize for reforming reactions, especially for reducing gas generation.

A nickel catalyst for reducing gas generation is conventionally produced by impregnating nickel on an alumina or magnesia carrier. In use because the reforming reaction is a strongly endothermic reaction and in order to obtain high hydrocarbon conversion, high temperatures are required for the reaction, sometimes running as high as 1000° C. Even when the reaction is conducted at lower temperatures, in the range of 700° C., it is still necessary to use low surface area alumina, such as alpha alumina as the carrier material for these catalysts. In fact, alpha alumina is the only alumina phase that is stable enough to be used as a carrier under conventional reforming conditions. With catalysts produced from alpha alumina carriers, however, the BET surface area, pore volume and nickel dispersion on these catalysts is quite low. For example, a conventional steam reforming catalyst of this type prepared with nickel on alpha alumina has a BET surface area in the range of 1–4 $m^2/g$, a pore volume from about 0.08 to 0.16 cc/gm and a nickel surface area from about 0.5 to 1.5 $m^2/g$.

While lanthanum-promoted alumina catalysts of U.S. Pat. No. 4,530,918 have shown some advantages in the production of carbon monoxide rich syngas at close to stoichiometric requirements, the surface area and nickel dispersion of these catalysts is still in a range comparable to conventional alpha alumina-based steam reforming catalysts with BET surface areas only slightly improved to about 5 $m^2/gm$ with a nickel specific surface area less than 2 $m^2/g$.

Thus, there is still a need to improve existing nickel on alumina catalysts for reforming reactions utilizing a feed stream containing significant quantities of CO and $CO_2$ and low quantities of steam (the feed stream having a $H_2O/CH_4<0.8$ and a $CO_2/CH_4>0.5$). Further, the addition of additives to these catalysts has not to date shown sufficient satisfactory results to overcome the coking problems while maintaining high reforming activity in the presence of a significant amount of sulfur.

Therefore, it is an object of the invention to disclose a process for catalytic reforming of a feed stream containing significant quantities of CO and $CO_2$ and low quantities of steam (the feed stream having a $H_2O/CH_4<0.8$ and a $CO_2/CH_4>0.5$) utilizing a catalyst of a particular composition.

These and other objects are obtained by the catalyst of the invention, its process of manufacture and process of use.

SUMMARY OF THE INVENTION

The invention is a process for catalytic reforming of a hydrocarbon feed streams containing significant quantities of $CH_4$, CO and $CO_2$, low quantities of steam (the feed stream having a $H_2O/CH_4$ of less than 0.8 and a $CO_2/CH_4$ of greater than 0.5) and relatively high quantities of sulfur compounds (1–20 ppm) wherein the catalyst comprises from about 25 to about 98 percent by weight alumina as a support, and about 2 to about 40 percent by weight nickel oxide, which is promoted with from about 0.5 to about 35 percent by weight calcium oxide, wherein the calcium oxide is combined with the alumina to form calcium aluminate.

DETAILED DESCRIPTION OF THE INVENTION

The present invention is a process for catalytic reforming of a feed stream containing at least 15 mole percent (and more typically 18–20 mole percent) of hydrocarbons, such as $CH_4$, low quantities of $H_2O$ (less than about 20 mole percent and preferably less than about 15 mole percent), significant quantities of CO and/or $CO_2$ (at least 20 mole percent of $CO+CO_2$, and typically more than 30 mole percent of $CO+CO_2$), and relatively high quantities of sulfur (about 1–20 ppm). The balance of the feed stream is hydrogen. The catalyst used for this process is a calcium oxide promoted, alumina supported, nickel catalyst. The catalyst of the invention has a considerably higher BET surface area and nickel surface area and greater pore volume than conventional alumina-supported nickel catalysts such as those used for conventional reducing gas generation reactions.

The precursor for the catalyst of the inventive process is prepared by combining a calcium compound promoter with an aluminum compound carrier material. The preferred composition of the precursor comprises from about 0.5 percent to about 25 weight percent and more preferably from about 2 percent to about 20 weight percent calcium, preferably in the form of calcium oxide or calcium hydroxide. Combined with the calcium compound promoter as the carrier of the catalyst is from about 25 to about 98 weight percent of an aluminum compound, preferably alumina or aluminum hydroxide, and more preferably alpha alumina.

The precursor material is formed such that the calcium compound promoter is combined with the aluminum compound carrier to form various calcium and aluminum combinations, such as hibonite ($CaO.6Al_2O_3$) and other calcium aluminates, such as $CaO.2Al_2O_3$ and $CaO.Al_2O_3$. Any stable calcium aluminate can be utilized. However, preferably, no free calcium oxide is detectable in the precursor by x-ray diffraction after the formation of the catalyst.

The precursor is formed by conventional procedures. Appropriate quantities of solid alumina and/or aluminum hydroxide are mixed with calcium aluminate cement, calcium oxide and/or calcium hydroxide. The mixture is then blended with graphite and water to form granules. The granules are then formed into any desirable shape, such as tablets, using a tabletting machine. The shape of the tablets is preferably cylindrical with one or multiple holes, preferably five to seven holes extending through each tablet. The formed tablets are then treated in a reactor under steam pressure up to 150 psig for about 4 to 24 hours. After steaming, the tablets are calcined to a temperature of about 250° C. to about 1700° C. for about 6 to about 36 hours to remove moisture and to develop ceramic bonds to form the calcium aluminates through a solid state reaction.

The preferred calcium-promoted, alumina carrier has a BET surface area of at least about 2 $m^2$/gram and a pore volume, measured by mercury penetration, of at least about 0.3 cc/gram.

After the calcium aluminate precursor material is formed, nickel is loaded onto the precursor by impregnation of the precursor material with a nickel salt solution. The precursor is preferably immersed in a nickel salt solution, such as nickel nitrate, and then dried and calcined at a temperature from about 350° C. to about 650° C. for about 1 to about 5 hours to transform the nickel nitrate to nickel oxide. Depending on the target nickel loading, multiple impregnation steps may be needed. The preferred nickel oxide loading on the precursor is from about 2 to about 30 weight percent, and more preferably from about 3 to about 20 weight percent nickel oxide.

Other metal additives may be added to the catalyst in addition to nickel, such as cobalt, and the noble metals.

Because of the presence of calcium aluminate as a component of the precursor, the catalyst has a substantially larger surface area and greater pore volume than conventional nickel on alumina steam reforming catalysts. The BET surface area of the calcium-promoted catalyst is at least about 4 $m^2$/g, preferably from about 4 $m^2$/g to about 35 $m^2$/g, and most preferably greater than 20 $m^2$/g. The nickel surface area on the catalyst, measured by hydrogen chemisorption at room temperature, is greater than about 2 $m^2$/g and preferably greater than 4 $m^2$/g. In addition, the pore volume of the calcium-promoted, nickel catalyst is greater than about 0.2 cc/gm, whereas the typical pore volume for conventional, nickel on alumina, steam reforming catalysts is only about 0.08 to 0.15 cc/gm. The calcium promotion also permits a better nickel dispersion on the catalyst body (as determined by using $H_2$ chemisorption for nickel surface area).

The catalyst of the process of the invention is especially useful for reforming reactions where the feed stream contains at least 15 mole percent (and more typically 18–20 mole percent) of hydrocarbons, such as $CH_4$. The quantity of steam in the feed stream is relatively low, i.e., less than about 20 mole percent and preferably less than 15 mole percent and the feed stream also contains significant quantities of CO and $CO_2$ (at least 20 mole percent of $CO+CO_2$ and typically more than 30 mole percent of $CO+CO_2$. The feed stream also preferably has a $H_2O/CH_4<0.8$ and a $CO_2/CH_4>0.5$. The feed stream also must contain a relatively high quantity of sulfur compounds, i.e., greater than 0.1 ppm, and may even have a quantity from about 1 up to about 20 ppm.

The catalyst of the process of the invention also operates well in conditions where carbon formation is thermodynamically possible as the catalysts exhibit higher carbon formation resistance than prior art nickel steam reforming catalysts.

The process of the invention is especially a reforming reaction which is not a conventional steam-reforming reaction. The process of the invention is especially for use in iron ore reduction, the production of methanol, Fischer-Tropsch synthesis and gas to liquid technology. These applications require a significantly lower ratio of $H_2$:CO and are therefore significantly different from conventional steam reforming processes.

In order to illustrate the present invention and advantages thereof, the following examples are provided. It is understood that these examples are illustrative and do not provide any limitation on the invention. In particular, it is important to understand that the present invention is preferably applicable to reforming reactions where the feed stream contains hydrocarbons, such as $CH_4$, low quantities of steam and high quantities of carbon dioxide ($H_2O/CH_4<0.8$, $CO_2/CH_4>0.5$), and also may contain relatively high quantities of sulfur compounds. The present invention is also generally applicable for use where the temperature of the reaction may result in coke being formed on conventional catalysts.

EXAMPLES

Example 1

The catalyst carrier is prepared by blending 36.29 kg of aluminum hydroxide and 11.24 kg of calcium aluminate cement with 6.2 kg distilled water and 2.7 kg graphite. The mixture is then tabletted, autoclaved at 20–100 psig for 10 hours, and calcined for 8 hours at 120° C.–400° C. followed by further calcining for 5 hours at 1250° C.–1350° C. The precursor is determined to contain 5.7 weight percent calcium oxide with the balance being alumina. The precursor is then analyzed under x-ray diffraction and discovered to be comprised of major phases of alpha alumina, hibonite ($CaO.6Al_2O_3$), and calcium aluminate ($CaO.2Al_2O_3$). Trace amounts of monoalumina calcium aluminate ($CaO.Al_2O_3$) are also present. However, there is no detectable free calcium oxide. The precursor has a BET surface area of 2.5 $m^2/g$ and a pore volume (measured by mercury penetration method) of 0.45 cc/gm. The precursor carrier is then impregnated with a nickel nitrate solution containing about 15 weight percent nickel. The impregnated precursor is then calcined for 2 hours at 400° C.–600° C. After calcination, the impregnation and calcination procedures are repeated twice for a total of three impregnations and three calcinations. The finished catalyst contains 13.3 weight percent nickel. The physical and performance characteristics of the catalyst are reported in Table 1.

Example 2

A catalyst is prepared as disclosed in Example 1 except the mixture comprises 100 kg of aluminum hydroxide, 10.9 kg of calcium hydroxide, 38.1 kg of calcium aluminate cement and 9.1 kg of graphite, and the resulting precursor has a 17.2 weight percent loading of calcium oxide with the balance being alumina. The major phases of the precursor are determined to be calcium aluminate and alpha alumina with no free calcium oxide detectable. Sufficient nickel nitrate is then impregnated onto the precursor to yield a nickel loading, after calcination, of 15.8 weight percent. The physical characteristics and performance characteristics of this catalyst are disclosed in Table 2.

Example 3

A catalyst is prepared as in Example 2 except sufficient potassium carbonate is added to produce a precursor having a 16.8 weight percent calcium oxide loading and a 2.0 weight percent potassium oxide loading. A precursor is initially blended, tabletted, autoclaved and calcined at 120° C.–400° C. as in Example 2. The potassium carbonate is then added, and the material is calcined for about 8 hours at 120° C.–400° C. followed by 5 hours at 1250° C.–1350° C. The major phases of the precursor are determined to be calcium aluminate and alpha alumina with no free calcium oxide detectable. When the precursor is analyzed by x-ray diffraction, a small percentage of potassium aluminate $KAl_{11}O_{17}$ is also determined to be present. Sufficient nickel nitrate is impregnated onto the precursor to yield a nickel loading, after calcination, of 17.1 weight percent. The physical characteristics and performance characteristics of this catalyst are disclosed in Table 1.

Comparative Example 4

A catalyst carrier is prepared by blending 100 kg alumina powder with 400 kg water in a mixer to make a slurry. The slurry is spray dried at a temperature of 120° C. to 370° C. About 1 kg aluminum stearate powder is then added to the mixture and the mixture is tabletted and calcined at 1500° C.–1600° C. for 5 hours. The tablets are then impregnated with sufficient nickel nitrate to yield a nickel loading, after calcination, of 14.8 weight percent. The physical characteristics and performance characteristics of this catalyst are disclosed in Table 1.

Testing Procedures

For each catalyst, the activity is tested in a tubular reactor system. The catalyst is first reduced and then tested at a gas hour space velocity (GHSV) of 100,000/h. The catalyst particles, having a typical size of about 5×7 mesh, are placed in a catalyst bed to test their performance in reforming a hydrocarbon feed stream. The feed stream consists of 19% CO, 18% $CH_4$, 14% $CO_2$, 13% $H_2O$, 35% $H_2$ all mole base and 2 parts per million $H_2S$. The $H_2O/CH_4$ ratio is 0.74 and the $CO_2/CH_4$ ratio is 0.79. Due to the high GHSV, the reformed gas does not reach thermal dynamic equilibrium even at 1500° F. (815.5° C.). A typical reformed gas has an $H_2/CO$ ratio of 1.8. The activity is indicated by the reaction rate shown on Table 1.

The carbon formation resistance of each catalyst is tested in a pressurized reaction as carbon formation is more pronounced at elevated pressures. The test temperature is at 1000° F. (537.8° C.) at the inlet and 1500° F. (815.5° C.) at the outlet of the catalyst bed. N-hexane is used as the feed for the hydrocarbon. 300 cc of catalyst sized to 12×16 mesh are used as the testing media. Reforming is carried out at 350 psig (24.1 bars) by decreasing the steam to carbon ratio at a theoretical hydrogen space velocity of 3,167/h from 6.0 until carbon formation is detected. The pressure differentiation between the inlet and the outlet of the reactor is measured. As the steam to carbon ratio decreases, carbon formation occurs and significant pressure differential is observed. The steam to carbon ratio before carbon formation is reported as an index of carbon formation resistance in Table 1.

TABLE 1

| Example Number | 1 | 2 | 3 | Comp. 4 |
|---|---|---|---|---|
| Ni (wt %) | 13.3 | 15.8 | 17.1 | 14.8 |
| CaO (wt %) | 4.7 | 13.7 | 13.1 | — |
| $Al_2O_3$ (wt %). | 78.4 | 66.2 | 63.6 | 80.5 |
| $K_2O$ (wt %) | 0.0 | 0.0 | 1.6 | 0.0 |
| Pore Volume (cc/g Catalyst) | 0.28 | 0.24 | 0.24 | 0.12 |
| BET Surface Area ($m^2$/g catalyst) | 8.0 | 14.5 | 26.6 | 3.3 |
| Nickel Surface Area (cc/g catalyst) | 2.0 | 3.8 | 4.0 | 1.2 |
| Mean Crystal Size (Å) | 494 | 164 | 148 | 876 |
| Activity Index | 25600 | 26200 | 21200 | 18400 |
| Carbon Formation Index | 3.0 | 3.0 | 1.25 | >5.5 |

It is surprisingly discovered that the catalyst of the invention has an improved activity index and a higher resistance to carbon formation than a conventional nickel on alumina catalyst.

Although the invention has been described in detail, it is clearly understood the same is by no way to be taken as a limitation. The scope of the present invention can only be limited by the appended claims.

What is claimed is:

1. A process for catalytic conversion comprising preparing a feed stream comprising $H_2O$, $CO_2$, $CH_4$, and CO at levels such that the $H_2O/CH_4$ is less than 0.8 and the $CO_2/CH_4$ is greater than 0.5, and relatively high quantities of sulfur compounds and passing that feed stream over a catalyst comprising from about 0.5 percent to about 25 percent by weight of a calcium compound additive, from about 2 percent to about 30 percent by weight nickel, and from about 25 percent to about 98 percent by weight of an aluminum compound carrier, wherein substantially all of the calcium is combined with the alumina.

2. The process of claim 1 wherein the concentration of sulfur in the hydrocarbon feed stream is greater than about 0.1 ppm.

3. The process of claim 1 wherein the concentration of sulfur in the hydrocarbon feed stream is greater than about 1 ppm.

4. The process of claim 1 wherein the quantity of $H_2O$ in the hydrocarbon feed stream is less than about 20 mole percent.

5. The process of claim 1 wherein the quantity of the CO plus $CO_2$ in the hydrocarbon feed stream is at least about 20 mole percent.

6. The process of claim 1 wherein the hydrocarbon feed stream comprises at least 15 mole percent of $CH_4$.

7. The process of claim 1 wherein the calcium combined with the alumina in the catalyst forms substantially calcium aluminate.

8. The process of claim 1 wherein the amount of free calcium oxide present in the catalyst is not detectable by x-ray diffraction.

9. The process of claim 1 wherein the calcium compound additive in the catalyst comprises from about 2 percent to about 20 percent by weight of the catalyst.

10. The process of claim 1 wherein the nickel in the catalyst comprises from about 2 to about 20 percent by weight of the catalyst.

11. The process of claim 1 wherein the nickel in the catalyst comprises from about 3 to about 20 percent by weight of the catalyst.

12. The process of claim 1 wherein the BET surface area of the catalyst is greater than 4 $m^2/g$.

13. The process of claim 1 wherein the BET surface area of the catalyst is from about 4 $m^2/g$ to about 35 $m^2/g$.

14. The process of claim 1 wherein the nickel surface area of the catalyst is greater than about 2 $m^2/g$.

15. The process of claim 1 wherein the nickel surface area of the catalyst is greater than about 4 $m^2/g$.

16. The process of claim 1 wherein the pore volume of the catalyst is greater than about 0.2 cc/gm.

* * * * *